Feb. 27, 1968 K. W. LINDSAY 3,370,855

AUDIO DEVICE

Filed June 2, 1965 2 Sheets-Sheet 1

INVENTOR.
KENNETH W. LINDSAY
BY
Amster & Rothstein
ATTORNEYS

United States Patent Office 3,370,855

Patented Feb. 27, 1968

3,370,855

AUDIO DEVICE

Kenneth W. Lindsay, Great Neck, N.Y., assignor to Ideal Toy Corporation, Hollis, N.Y., a corporation of New York Filed June 2, 1965, Ser. No. 460,738
9 Claims. (Cl. 274—1)

ABSTRACT OF THE DISCLOSURE

An audio device for use in a doll and the like. An axially rotatable record cylinder is mounted on a support for rotation and also for movement into and out of a playing position. Sound-reproducing means are arranged to engage the record cylinder in the playing position. An actuating assembly connected to the cylinder drives it during each play. The actuating assembly is first energized by a pull string which is withdrawn from the device. The pull string, in addition to energizing the actuating assembly, moves the record cylinder out of the playing position to restore the sound-reproducing means to its initial position. Upon release of the pull string the record cylinder is restored to the playing position. Preferably, the record cylinder has a plurality of circumferentially extending grooves which are interleaved with each other to enable the sound-reproducing means to track any one of the grooves for playback of the corresponding sound sequence.

The present invention relates generally to an audio device for use in dolls, toys and the like, and in particular to a miniature phonograph which is capable of producing any one of a number of different audio sequences.

It has long been known to have a record disc having recorded thereon a plurality of discrete sound sequences all starting at the same starting position contiguous to the outer edge of the record and spiraling towards the center thereof in interleaved fashion. With this type of record, depending upon the rotational orientation of the record disc relative to the stylus when the latter is set down contiguous to the outer edge of the record, one of the plural sound sequences is played back. Of more recent times, a smaller version of this so-called multi-groove disc has been incorporated in a phonograph device for use in various types of toys, including dolls. Such phonograph device, which is likewise old and well known, includes a stylus mounted on a stylus arm arranged to track a sound groove on the record disc. Stylus movement in turn is converted into an audible reproduction of the sound sequence by coupling the stylus to a speaker. The record disc is turned at the required speed, as by the provision of a spring motor, which may be loaded by a drawstring. A governor is provided in such phonograph mechanisms to assure constant speed turning of the record disc to achieve the desired playback of the sound sequence recorded thereon. When such multi-groove record disc is embodied in a drawstring-operated phonograph device, any one of the plurality of discrete sound sequences can be played, either on a random basis or in a particular order. Recently, such devices have also been adapted for drive by a small fractional horsepower motor operated from one or more batteries. However, whether incorporating a manually-actuated spring motor or a battery-operated electric motor, such devices are of such size that then cannot be incorporated into relatively small toys and dolls. There exists a need for phonograph mechanisms which are of a size such that it can be incorporated into relatively small toys including, without limitation, so-called twelve inch fashion dolls. Such phonograph mechanisms should be capable of being manufactured at relatively low unit cost and should be of exceptionally reliable and rugged construction to tolerate repeated use, and to some extent abuse, as is occasioned with many toys.

Broadly, it is an object of the present invention to provide an improved audio device which realizes one or more of the aforesaid objectives. Specifically, it is within the contemplation of the present invention to provide a miniature phonograph which is capable of playing one of a pluraliy of discrete sound sequences and is suitable for manufacture at a relatively low unit cost.

In accordance with an illustrative embodiment demonstrating objects and features of the present invention there is provided an audio device which comprises a support and an axially rotatable record cylinder mounted on the support for rotation and for movement into and out of a playing position. Sound-reproducing means are arranged to engage the record cylinder in the playing position. An actuating assembly is provided which includes a spring which is adapted to be wound onto a spring-receiving capstan operatively connected to the record cylinder. A string-receiving pulley is operatively connected to the record cylinder and a pull string is wound on the pulley and arranged to move the record cylinder out of the playing position and to wind at least a portion of the spring onto the capstan. The record cylinder is arranged to be restored to the playing position upon release of the pull string; and the spring itself is effective during rewind to rotate the record cylinder for a prescribed playing interval. Preferably, the record cylinder has a plurality of circumferentially extending record grooves which are interleaved with each other, with each of the record grooves having an independent entry end circumferentially spaced about one end of the record cylinder and an exit end at the other end of the record cylinder. Accordingly, the sound-reproducing means may track any one of the plural record grooves for playback of the corresponding sound sequence.

The above brief description, as well as further objects, features and advantages of the present invention will be more fully appreciated by reference to the following detailed description of a presently preferred, but nonetheless illustrative embodiment in accordance with the present invention, when taken in conjunction with the accompanying drawings, wherein.

Figures 1, 2, 4:
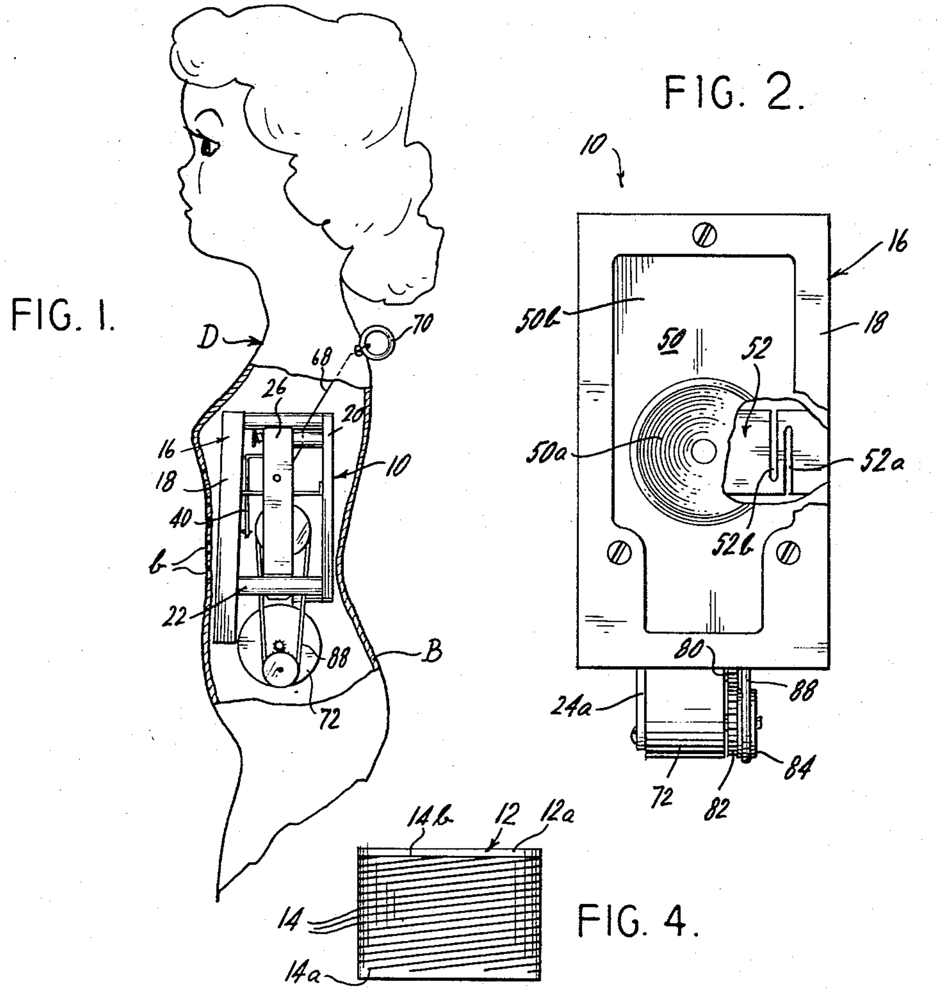
FIG. 1 is an elevational view, with parts broken away and in section, showing an audio device in accordance with the present invention mounted within a typical fashion doll.
FIG. 2 is a front elevational view of the audio device, with parts broken away, to show the internal construction thereof.
FIG. 4 is an elevational view of a typical record cylinder embodied in the audio device.

Referring now specifically to the drawings, and in particular to FIG. 1, there is shown an audio playback device, generally designated by the reference numeral 10, which embodies features of the present invention and has been mounted in a typical doll D which presents an available space for the device 10 of less than two inches in width, four inches in height and two inches in depth. The audio device 10 may be mounted within the doll D in any convenient fashion, as for example by having the audio device completely self-contained on its own support, as illustrated, or by actually employing the doll body B as the only physical support for the audio device. In the latter instance, the doll body B is constructed of at least two parts to facilitate the initial mounting and assembly of the audio device therein.

The device 10 includes an axially-rotatable record cylinder 12 (see FIG. 4) which has a peripheral record surface 12*a* formed with a plurality of record grooves 14 cut thereon. In this illustrative embodiment, the record cylinder has a number of circumferentially extending interleaved record grooves, the grooves or tracks 14 each having an independent entry end (i.e., entry end 14*a*) at one end of the record cylinder, which are disposed at successive spaced locations about the circumference of the record cylinder and a common exit end 14*b* at the other end of the record cylinder 12. Thus, depending upon the cylinder location relative to the set down point of the stylus, any one of the plurality of discrete sound sequences can be played back by the instant record playing mechanisms 10.

Figure 5:
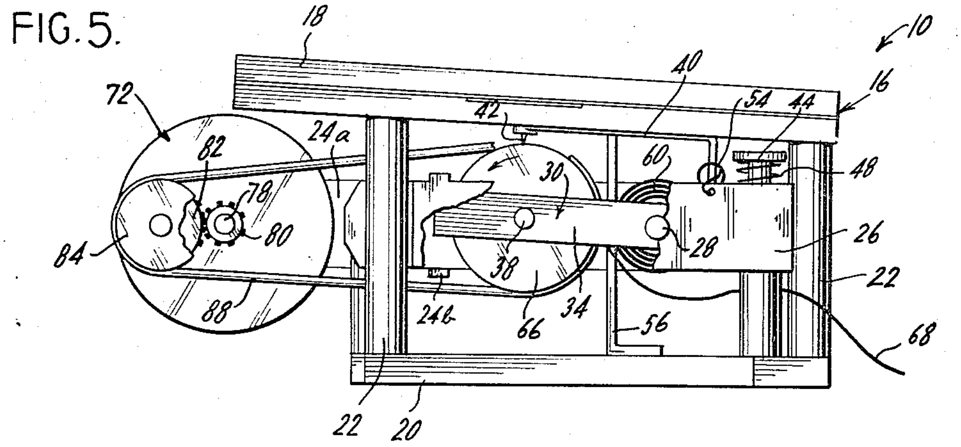
FIG. 5 is a side elevational view, with parts broken away, taken from below FIG. 3 and showing the record cylinder in a playing position engaged by the stylus during the playback of one of the sound sequences.
Figure 7:
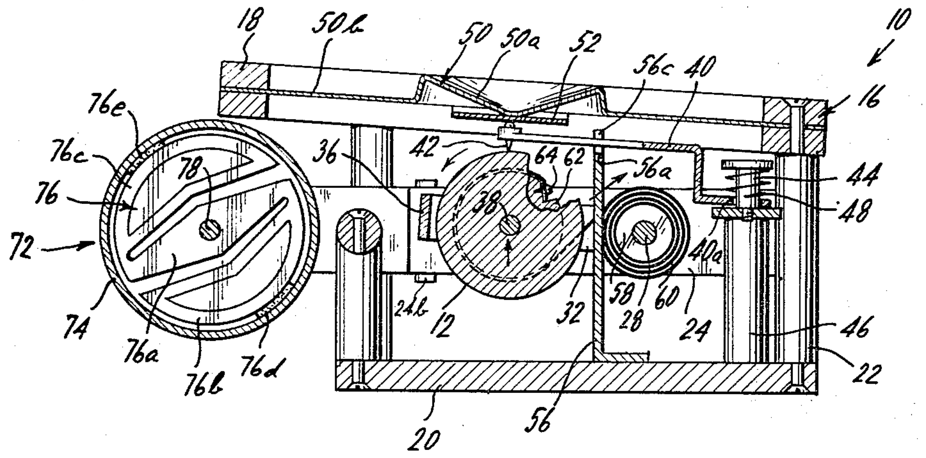
FIG. 7 is a sectional view taken substantially along the line 7—7 of FIG. 3 looking in the direction of the arrows and showing the record cylinder in the playing position; and, FIG. 8 is a sectional view taken substantially along the line 8—8 of FIG. 3 showing the stylus in the set down position with the record cylinder in the non-playing position.
Figures 6, 8:
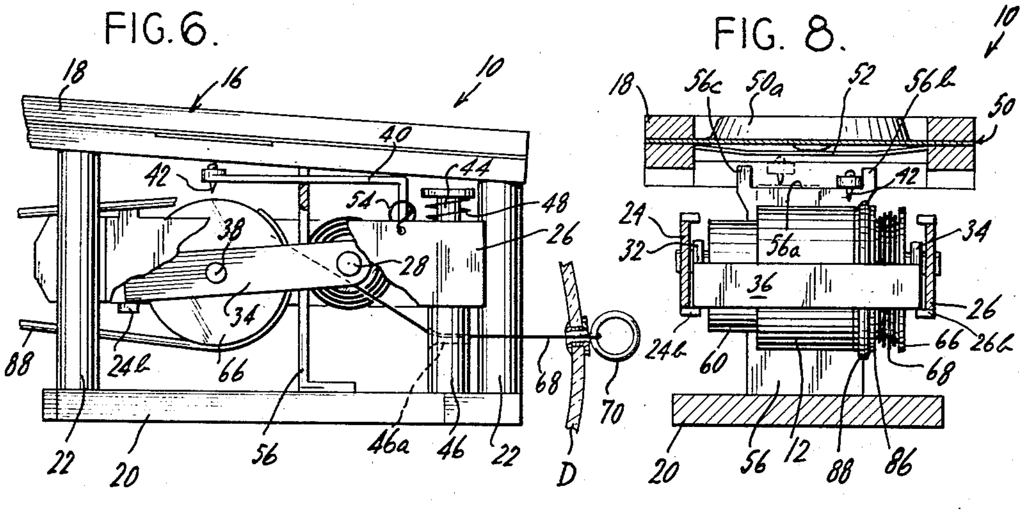
FIG. 6 is a fragmentary elevational view similar to FIG. 5, but showing the record cylinder in the non-playing position which is attained by commencing to pull on the pull string associated with the spring motor of the actuating mechanisms for the audio device.

The record cylinder 12 is not only mounted for axial rotation, but in addition is mounted for displacement, as by rocking about a pivot, between the playing position illustrated in FIGS. 5 and 7 and the non-playing position illustrated in FIG. 6. To this end, there is provided a support 16 which includes a front plate 18, a back plate 20, a plurality of interconnecting posts 22 and opposite side members 24, 26. Extending between the opposite side members 24, 26 is a rocker shaft 28 which is secured to the side members 24, 26. Rockably mounted on the rocker shaft 28 is a U-shaped cylinder-supporting frame 30 which includes opposite side members 32, 34 interconnected by a front member 36. Extending in spaced parallel relation to the rocker shaft 28 is a cylinder shaft 38 which is secured to the opposite side members 32, 34 of the frame 30 and serves to axially journal the record cylinder 12. Thus, the record cylinder 12 may be pivoted or rocked about shaft 28 as an axis for movement between the playing position of FIG. 5 and the non-playing position of FIG. 6.

Sound-reproducing means are arranged to coact with the record cylinder in the playing position to play back any one of the discrete sound sequences of the grooves or tracks 14. In this illustrative arrangement, the record is cut on the hill and dale system. Accordingly, the sound-reproducing means includes a stylus arm 40 having a stylus 42 which is capable of tracking such record groove or track. The stylus 42 must track at right angles to the axis of the record cylinder 12 and therefore the stylus arm 40 is loosely mounted such that the stylus can track this movement. Specifically, the rearward end of the stylus arm 40 is provided with an oversized hole 40*a* which is received on an upstanding mounting pivot 44 which in turn is supported on a stylus post 46. A spring 48 serves to bias the stylus arm 40 in a direction such that the stylus 42 engages the record groove with the required tracking force. The tracking movement of the stylus 42 is coupled to a speaker assembly 50 via a resilient motion-transmitting member 52 which couples the stylus to the speaker assembly over the entire traverse of the stylus arm. The speaker assembly is of vacuum-formed plastic and includes a cone section 50*a* formed integrally with a suspending diaphragm 50*b* which is mounted on the front plate 18 of the support 16, as seen best in FIG. 2. The motion-transmitting member 52 is in the form of a resilient cross piece which extends transversely of the front plate 18 and is mounted thereon. At the opposite sides of the speaker section 50*a*, the motion-transmitting member 52 is formed with respective pairs of transverse cuts (i.e., cuts 52*a*, 52*b* in FIG. 2) such that the central or medial section thereof is suspended to accurately track the stylus movement and impart corresponding movements to the speaker section 50*a* for activating the same.

Figure 3:
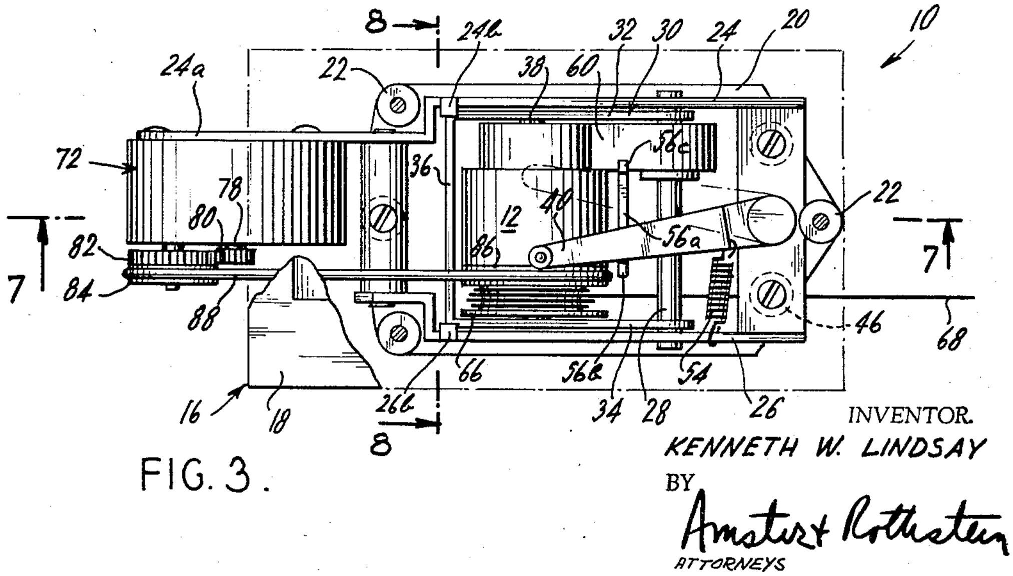
FIG. 3 is a front elevational view, similar to FIG. 2 but on an enlarged scale, with the front support removed to show the internal construction of the audio device.

By the illustrated arrangement, the stylus arm 40 is capable of moving axially of the record cylinder 12, as may be appreciated by comparing the full and broken line showings in FIGS. 3 and 8. Initially, the stylus arm 40 is biased into a set down position by a spring 54 which is connected to the stylus arm 40 intermediate the ends thereof and to the side member 26 of the support 16. Provision is made for accurately limiting the swing of the stylus arm 40 as it tracks from the set down position contiguous to one end of the cylinder 12 and the corresponding entry ends of the multiple grooves 14 to a lift off position at the opposite ends of the cylinder. To this end, a stylus stop 56 is mounted on the base plate 20 and projects upwardly towards the front plate 18, and terminates in an elongated flat 56*a* having projections 56*b*, 56*c* at the opposite ends thereof. The flat 56*a* establishes a limit position for the stylus 42 such that when the record cylinder 12 is moved to the non-playing position, the stylus 42 may be reset to the set-down position, with the stylus arm sliding along the flat 56*a*. The projection 56*b* in cooperation with the spring 54 establishes the set down position such that the stylus 42 may engage any one of the multiple tracks depending upon the rotational position in which the cylinder 12 happens to stop at the end of any playing interval. Finally, the projection 56*c* limits the tracking movement of the stylus along the peripheral surface of the record cylinder 12 to be certain that the stylus will not overrun. When the record cylinder 12 is displaced into the non-playing position illustrated in FIG. 6 and with the stylus assembly in a position removed from the set down position (i.e., the dotted line positions illustrated in FIGS. 3 and 8), the stylus will automatically be restored to the set down position by the spring 54.

An actuating assembly is provided for axially rotating the record cylinder 12 for a prescribed interval and at the required speed to playback any one of the multiple grooves or recordings and, in this particular embodiment, to enable automatic reset of the stylus arm incident to the loading of such actuating assembly. The actuating assembly includes a spring drum 58 journalled on the rocker shaft 28 to one side of the record cylinder 12 and contiguous to the side members 32, 24 of the rocker frame 30 and suport 16 respectively. Normally a coiled actuating or clock spring 60 is wound on the drum 58. Disposed in alignment with the drum 58 and coaxially of cylinder 12 is a spring-receiving capstan 62 which has one end of the spring 60 anchored thereon at 64 (see FIG. 7). With continued reference to FIGS. 5 to 7 inclusive, it will be appreciated that clockwise rotation of the record cylinder 12 will cause the spring 60 to unwind from the drum 58 and wind up on the capstan 62. Upon release, the spring will rewind onto the drum and cause the record cylinder 12 to turn in the counterclockwise direction, as indicated by the directional arrow, for a prescribed playing interval determined by the loading of spring 60 and the parameters of the system. The record 12 is recorded for playback with such counterclockwise turning movement of the record cylinder 12. The manner of connecting the actuating spring 60 to the record cylinder 12 is such that a tangential force will be directed by the spring such as to normally bias the record cylinder 12 into the playing position, such force being indicated by the vertical direction arrow in FIG. 7.

Manual operating means are operatively connected to the actuating assembly for moving the record cylinder out of the playing position against the bias of the actuating spring 60 and for winding up the spring onto the spring-receiving capstan 62 secured to the record cylinder 12. Specifically, a string-receiving pulley 66 is secured coaxially of the record cylinder 12 and has wound thereon a pull string 68 which passes through an aperture 46*a* in the stylus post 46 and out the back of the body B of the doll D, preferably in the shoulder blade region as illustrated in FIG. 1. The pull string is provided with a pull ring 70. The pull string 68 is wound on the string-receiving pulley 66 in a direction such that upon the pulling of the string and the extension thereof relative to the doll body B, the unitary assembly of the pulley 66, the record cylinder 12 and the spring-receiving capstan 62 are turned in the clockwise direction. Incident to the exerting of such pull on the pull string, as may be appreciated by progressively inspecting FIGS. 5 and 6, a force is developed on the rockable assembly 66, 12, 64 which overcomes the normal bias of the actuating spring 60 and physically displaces the rockable assembly to a limit position determined by stops 24*b*, 26*b* provided respectively on the side members 24, 26 of the support or frame 16. Since the actuating spring 60 is physically anchored to the capstan 62 by a screw 64 or the like, the pull on the string 68 manifests itself as a winding up of the actuating spring 60 onto the capstan 62 which is effective, as is generally understood, to load this type of spring motor. The degree of loading is determined by the effective length of the pull string 68 which is established to assure that the spring motor is sufficiently loaded for turning the record cylinder for the desired playing interval or duration. In the first instance, this is determined by the time required to track any one groove 14 of record cylinder 12 from end to end.

A constant speed governor, generally designated by the reference numeral 72, is operatively connected to the record cylinder 12 for governing the speed thereof such that it turns at an appropirate rate to properly play back the information recorded thereon. The governor 72 includes a cylindrical housing 74 which is mounted on an extension 24*a* of the side member 24. Journalled within the housing 74 is a rotor 76 which is supported on a rotor shaft 78. The rotor 76 includes a central web 76*a* and oppositely directed shoes 76*b*, 76*c* carrying respective pressure pads 76*d*, 76*e* thereon. As is generally understood, the shoes via their respective pads 76*d*, 76*e* will bear against the inner surface of the housing 74 to regulate the speed at which the record cylinder 12 is driven by the spring motor. The rotor shaft 78 of the governor 72 is coupled via gearing 80, 82 to a drive pulley 34 which in turn is connected to a driven pulley 86 via belt 88. The drive pulley 84 is connected to the gear 82 while the driven puley 86 is connected to the record cylinder 12. The respective shoes 76*b*, 76*c* will move outwardly under the influence of centrifugal force to establish a substantially constant speed for the record cylinder, not withstanding the tendency of the motor or clock spring 60 to turn the record cylinder 12 at a progressively changing speed.

The audio or playback device 10 is mounted within the doll body B, with the speaker cone 50*a* directed toward openings *b* formed in the front wall of the doll D in the stomach region. Alternatively, if the audio device 10 is mounted with the doll body B itself serving as the support, the speaker may be directly exposed through the front wall of the doll body.

At the end of a playing interval, the stylus 42 is the run out groove at the corresponding end of the cylinder, as shown by the dotted lines in FIG. 3. The child grasps the pull ring 70 and upon pulling thereon will initially develop sufficient force to cause the record cylinder 12 to move from the playing position illustrated in FIG. 5 into the non-playing position illustrated in FIG. 6. Initially, this movement displaces the record cylinder, the capstan 62 and string-receiving pulley 66 and causes the record cylinder to move to a clearance position with respect to the stylus 42. Thereupon, the stylus arm, under the influence of the spring 54, will return to the set down position illustrated in the full lines in FIGS. 3 and 8. As a continued pull is exerted on the pull string 68, the elements 66, 12, 62 will turn in the clockwise direction thereby causing the actuating or clock spring 60 to wind up onto the capstan 62. During such wind up, the drum 58 freely rotates on the rocker shaft 28. After the actuating spring 60 has been transferred in whole or in part, onto the capstan 62 against its normal bias and in an amount determined by the length of the pull string and the pull exerted by the user, the pull string is released. Immediately, the actuating spring 60 will return the cylinder 12 to the playing position and concurrently cause the same to rotate in the counterclockwise direction, as indicated by the rotational arrow in FIG. 7, for a predetermined playing interval. During such playing interval, the governor 72 assures that there will be a constant speed turning of the record cylinder. Throughout the playing interval, the stylus 42 will track along one of the grooves and the tracking motion, which manifests itself as a displacement of the stylus at right angles to the axis of turning of the record cylinder, will be coupled by the motion-transmitting member 52 to cone 50*a* of the speaker 50. This provides an audible reproduction of the particular sound sequence recorded on the tracked groove of the record cylinder. It will of course be appreciated that the stylus 42 is capable of engaging any one of the plural entry ends 14*a* of the record cylinder depending upon the rotational orientation of the cylinder at the beginning of the playing interval. Usually, this will cause random playback since varying degrees of pull will be exerted by the user and no positive provision is made for stopping the record cylinder in any one position of its rotation. In the event that random playback is not desired, provision can be made for positively determining the order in which the plural grooves are played back.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. An audio device comprising an axially rotatable record cylinder normally disposed in a playing position, said record cylinder having a plurality of peripheral record grooves which are interleaved with each other, each of said record grooves having an independent entry end circumferentially spaced about one end of said record cylinder and an exit end at the other end of said record cylinder, sound-reproducing means arranged to coact with said record cylinder in said playing position, said sound-reproducing means including a stylus arm having a stylus thereon adapted to selectively engage one of said record grooves, means mounting said stylus arm for tracking movement relative to said record cylinder such that said stylus can selectively track said record grooves from the entry ends to the exit ends thereof, a spring normally biasing said stylus arm to a set down position at said one end of said record cylinder wherein said stylus is adapted to randomly engage the corresponding entry end of one of said record grooves, means operatively connected to said record cylinder for periodically displacing the same out of said playing position whereby said stylus arm is capable of being returned to said set down position, actuating means operatively connected to said record cylinder and including a spring motor arranged to normally urge said record cylinder into said playing position and manual operating means operatively connected to said actuating means for moving said record cylinder out of said playing position and for winding up said spring motor, said record cylinder being restored to said playing position upon release of said manual operating means.

2. An audio device comprising an axially rotatable record cylinder normally disposed in a playing position, said record cylinder having a plurality of peripheral record grooves which are interleaved with each other, each of said record grooves having an independent entry end circumferentially spaced about one end of said record cylinder and an exit end at the other end of said record cylinder, sound-reproducing means arranged to coact with said record cylinder in said playing position, said sound-reproducing means including a stylus arm having a stylus thereon adapted to selectively engage one of said record grooves, means mounting said stylus arm for tracking movement relative to said record cylinder such that said stylus can selectively track said record grooves from the entry ends to the exit ends thereof, a spring normally biasing said stylus arm to a set down position at said one end of said record cylinder wherein said stylus is adapted to randomly engage the corresponding entry end of one of said record grooves, means operatively connected to said record cylinder for periodically displacing the same out of said playing position whereby said stylus arm is capable of being returned to said set down position, actuating means operatively connected to said record cylinder and including a spring motor arranged to normally urge said record cylinder into said playing position, manual operating means operatively connected to said actuating means for moving said record cylinder out of said playing position and for winding up said spring motor, said record cylinder being restored to said playing position upon release of said manual operating means, and a constant speed governor operatively connected to said record cylinder.

3. An audio device comprising a record cylinder having a peripheral recording surface and normally disposed in a playing position, means mounting said record cylinder within said device for axial rotation and for movement out of said playing position, sound-reproducing means engaging said record cylinder in said playing position, an actuating assembly including a spring, a spring-receiving capstan operatively connected to said record cylinder, said spring being operatively connected to said capstan and being windable thereon in response to rotation of said record cylinder in one direction, a string-receiving pulley operatively connected to said record cylinder and a pull string wound on said pulley and arranged to move said record cylinder out of said playing position and to wind at least a portion of said spring onto said capstan, said record cylinder being restored to said playing position upon release of said pull string and said spring being effective during rewind to rotate said record cylinder in the opposite direction for a playing interval.

4. An audio device comprising a record cylinder having a peripheral recording surface and normally disposed in a playing position, circumferential record grooves cut in said recording surface and each having an entry end at one end of said cylinder and an exit end at the other end of said cylinder, means mounting said record cylinder within said device for axial rotation and for movement out of said playing position, sound-reproducing means engaging said record cylinder in said playing position, an actuating assembly including a coil spring, a spring-receiving capstan operatively connected to said record cylinder, said coil spring being operatively connected to said capstan and being windable thereon in response to rotation of said record cylinder in one direction, a string-receiving pulley operatively connected to said record cylinder and a pull string wound on said pulley and arranged to move said record cylinder out of said playing position and to wind at least a portion of said coil spring onto said capstan, said record cylinder being restored to said playing position upon release of said pull string and said coil spring being effective during rewind to rotate said record cylinder in the opposite direction for a playing interval.

5. An audio device comprising, a record cylinder having a peripheral recording surface and normally disposed in a playing position, circumferential record grooves cut in said recording surface and each having an entry end at one end of said cylinder and an exit end at the other end of said cylinder, means mounting said record cylinder within said device for axial rotation and for movement out of said playing position, sound-reproducing means engaging said record cylinder in said playing position, an actuating assembly including a coil spring, a spring-receiving capstan operatively connected to said record cylinder, said coil spring being operatively connected to said capstan and being windable thereon in response to rotation of said record cylinder in one direction, a string-receiving pulley operatively connected to said record cylinder, a pull string wound on said pulley and arranged to move said record cylinder out of said playing position and to wind at least a portion of said coil spring onto said capstan, said record cylinder being restored to said playing position upon release of said pull string and said coil spring being effective during rewind to rotate said record cylinder in the opposite direction for a playing interval, and governor means operatively connected to said record cylinder for governing the speed thereof during said playing interval.

6. An audio device for use in a doll or the like comprising a record cylinder having a peripheral recording surface, circumferential record grooves cut in said recording surface and each having an entry end at one end of said record cylinder, means including a mounting shaft rockably mounting said record cylinder within said device for movement between a playing position and a non-playing position, sound-reproducing means engaging said record cylinder in said playing position and including a movable stylus assembly arranged to track in one of said record grooves during a playing interval, means normally biasing said stylus assembly into a set down position at said one end of said record cylinder, an actuating assembly including a drum and an actuating spring normally coiled thereon, a spring-receiving capstan coaxial of said record cylinder and operatively connected thereto, said actuating spring being operatively connected to said capstan and being windable therein in response to rotation of said record cylinder in one direction and being operative to normally urge said record cylinder into said playing position, a string-receiving pulley coaxial of said record cylinder and operatively connected thereto and a pull string wound on said pulley and arranged upon being pulled to move said record cylinder into said non-playing position and to wind at least a portion of said actuating spring onto said capstan, said stylus assembly being restorable to said set down position when said record cylinder is moved out of said playing position, said record cylinder being restored to said playing position upon release of said pull string and said actuating spring being effective during rewind from said capstan onto said drum to turn said record cylinder in the opposite direction during said playing interval.

7. An audio device for use in a doll or the like comprising a record cylinder having a peripheral recording surface, circumferential record grooves cut in said recording surface and each having an entry end at one end of said record cylinder and an exit end at the other end of said record cylinder, means including a mounting shaft rockably mounting said record cylinder for movement between a playing position and a non-playing position, sound-reproducing means engaging said record cylinder in said playing position and including a movable stylus assembly arranged to track in one of said record grooves during a playing interval, means normally biasing said stylus assembly into a set down position at said one end of said record cylinder, an actuating assembly including a drum and an actuating spring normally coiled thereon, a spring-receiving capstan coaxial of said record cylinder and operatively connected thereto, said actuating spring being operatively connected to said capstan and being windable therein in response to rotation of said record cylinder in one direction, and being operative to normally urge said record cylinder into said playing position, a string-receiving pulley coaxial of said record cylinder and operatively connected thereto, a pull string wound on said pulley and arranged upon being pulled to move said record cylinder into said non-playing position and to wind at least a portion of said actuating spring onto said capstan, said stylus assembly being restorable to said set down position when said record cylinder is moved out of said playing position, said record cylinder being restored to said playing position upon release of said pull string and said spring being effective during rewind from said capstan onto said drum to turn said record cylinder in the opposite direction during said playing interval, and governor means operatively connected to said record cylinder for governing the speed thereof during said playing interval.

8. An audio device for use in a doll or the like comprising a mounting shaft, a record cylinder journaled on said mounting shaft for axial rotation and having circumferentially extending and interleaved record grooves, each of said grooves having an independent entry end at successive spaced locations about the circumference of said record cylinder contiguous to one end of said cylinder and an exit end at the other end of said cylinder, sound-reproducing means engaging said record cylinder in a playing position and including a movable stylus assembly arranged to track in one of said record grooves during a playing interval, means operatively connected to said mounting shaft and rockably mounting said record cylinder within said device for movement out of said playing position, an actuating assembly including a spring operatively connected to said record cylinder and being operative to normally urge said record cylinder into said playing position, a string-receiving pulley coaxial of said record cylinder and operatively connected thereto, a pull string wound on said pulley and arranged upon being pulled to move said record cylinder out of said playing position and to unwind at least a portion of said spring, said record cylinder being restored to said playing position upon release of said pull string and said spring being effective during rewind onto said drum to turn said record cylinder for a playing interval.

9. An audio device for use in a doll or the like comprising a mounting shaft, a record cylinder journaled on said mounting shaft for axial rotation and having circumferentially extending and interleaved record grooves, each of said grooves having an independent entry end at successive spaced locations about the circumference of said record cylinder contiguous to one end of said cylinder and an exit end at the other end of said cylinder, sound-reproducing means engaging said record cylinder in a playing position and including a movable stylus assembly arranged to track in one of said record grooves during a playing interval, means operatively connected to said mounting shaft and rockably mounting said record cylinder within said device for movement out of said playing position, an actuating assembly including a drum journaled on said device and a coil spring normally supported on said drum, a spring-receiving capstan coaxial of said record cylinder and operatively connected thereto, said coil spring being operatively connected to said capstan and being windable thereon in response to rotation of said record cylinder, said coil spring being operative to normally urge said record cylinder into said playing position, a string-receiving pulley coaxial of said record cylinder and operatively connected thereto, a pull string wound on said pulley and arranged upon being pulled to move said record cylinder out of said playing position and to wind at least a portion of said coil spring onto said capstan, said record cylinder being restored to said playing position upon release of said pull string and said coil spring being effective during rewind from said capstan onto said drum to turn said record cylinder for a playing interval, and governor means operatively connected to said record cylinder for governing the speed thereof during said playing interval.

References Cited

UNITED STATES PATENTS

| | | | |
|---|---|---|---|
| 800,800 | 10/1905 | Edison | 274—44 |
| 1,167,842 | 1/1916 | Rotter et al. | 274—1.1 X |
| 1,918,777 | 7/1933 | Panish | 274—1.1 X |
| 3,082,006 | 3/1963 | Ryan | 274—1.1 X |
| 1,979,067 | 10/1934 | Franklin | 274—9 |

HARRY N. HAROIAN, *Primary Examiner.*

LEONARD FORMAN, *Examiner.*